Dec. 15, 1953

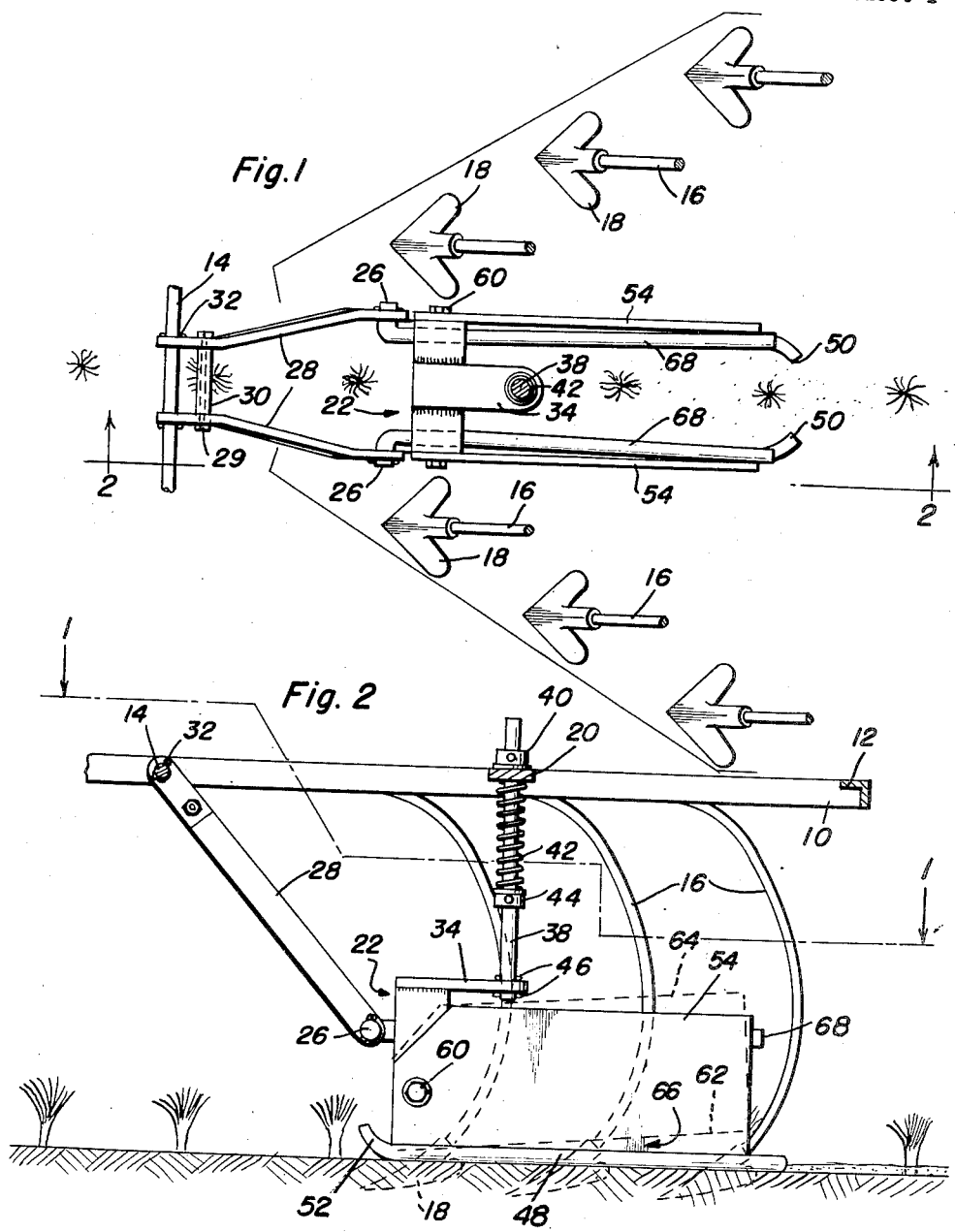

L. HAMMON 2,662,462

CULTIVATOR

Filed Jan. 18, 1951

Lester Hammon
INVENTOR.

Patented Dec. 15, 1953

2,662,462

UNITED STATES PATENT OFFICE 2,662,462

CULTIVATOR

Lester Hammon, Poplar Bluff, Mo., assignor of fifty per cent to E. A. Maddux, Butler County, Mo.

Application January 18, 1951, Serial No. 206,653

5 Claims. (Cl. 97—188)

This invention relates generally to cultivators and more particularly to a cultivator unit which may be either an attachment for a conventional cultivator or the device may be incorporated when the cultivator is initially manufactured.

A primary object of the invention is to provide a cultivator unit which will throw a certain amount of earth around the plants in a drill of plants as the cultivator is propelled along the drill, there ordinarily being provided cultivator shovels on those portions of the cultivator disposed laterally of the unit which is the principal subject matter of this invention.

Ancillary objects of this invention include the provision of means for cultivation of the earth immediately adjacent the plants in a drill of plants, and the killing of weeds growing near the plants by covering these weeds with earth.

Another object of this invention is to provide a cultivator unit which can be adjusted to vary the amount of earth moved toward the plants, this adjustment being sensitive since the downward pressure of the unit on the ground can be changed and the earth baffles or plates on the sides of the unit are adjustable as well.

Another object of this invention is to provide a hilling unit which will not displace or injure plants, even when the cultivator is propelled in imperfect alignment with the drill in which the plants are growing.

A last object to be mentioned specifically is to provide cultivator means of the character mentioned above which is relatively inexpensive and practicable to manufacture, which is simple and convenient to adjust and operate and which will give generally efficient and durable service.

With these objects definitely in view, this invention resides in certain novelties of construction, combination, and arrangement of elements and portions as will be hereinafter described in detail in the specification, particularly pointed out in the appended claims and illustrated in the accompanying drawings which form a material part of this application, and in which:

Figure 1 is a sectional plan view of the cultivator unit taken substantially on the planes indicated by the line 2—2 of Figure 2, the view including fragmentary representation of cultivator shovels ordinarily used with the device and a forwardly disposed cross bar of the cultivator frame;

Figure 2 is a longitudinal vertical sectional view taken substantially from the line 2—2 in Figure 1;

Similar characters of reference designate similar or identical elements and portions throughout the specification and throughout the different views in the drawing.

Figure 3:
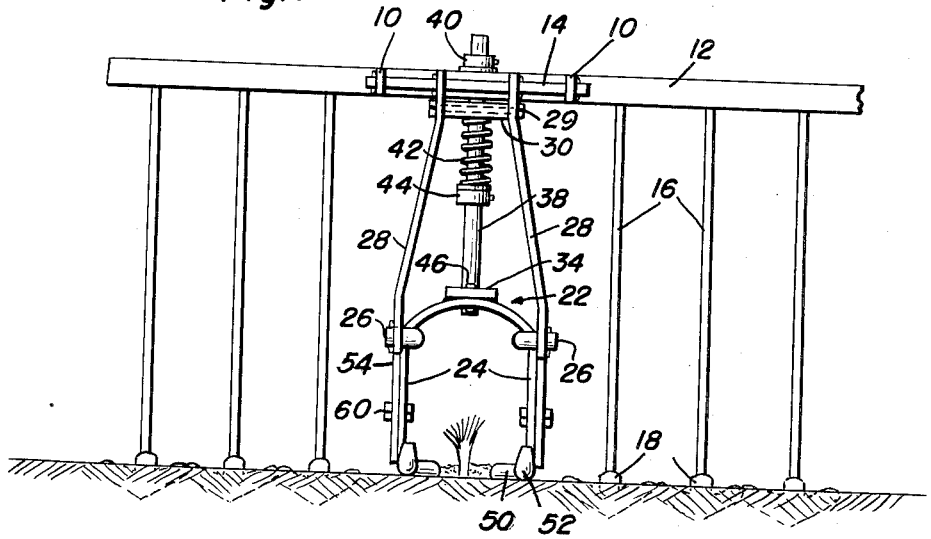
Figure 3 is a front elevational view of the cultivator unit, with portions of the cultivator frame elements and the cultivator shovels.

Referring now to the drawings in detail, the environment wherewith this invention is adapted to be used will include cultivator elements including longitudinal horizontal frame elements 10, a rearwardly disposed transverse frame element 12, a forwardly disposed cross bar 14 terminally supported on the frame elements 10, as well as a plurality of shanks 16 supported on other frame elements and carrying cultivator shovels 18. The forwardly disposed cross bar 14 and another cross bar 20 constitute the frame elements with which this invention is directly concerned, and the cross bars 14 and 20 may be considered as constituting portions of this invention.

The cultivator unit includes an inverted U-shaped frame 22 having parallel depending arms 24 of plate character. Pivots 26 are rigidly secured to the arms 24 and a pair of inflexible opposing links 28 are suitably mounted on the pivots 26, while forward end portions of the links 28 are connected by a bolt 29, with a sleeve 30 arranged coaxially of the bolt and serving as a spacer member between said forward ends of the links. The forward ends of the links are also apertured and are received on the cross bar 14, this cross bar being provided with cotter pins 32 or analogous structure to hold the links 28 against shifting longitudinally of the cross bar 14, while allowing pivotal action of the links on this bar 14.

A plate-like lug 34 is rigidly secured, as by welding, to the bight portion of the frame 22 and extends rearwardly therefrom, the rear end of this lug 34 being apertured as indicated at 36. The aperture 36 receives the lower end of a cylindrical shaft 38, the upper end of the shaft extending through the cross bar 20 and being in free sliding relation with this cross bar. A collar 40 is adjustably secured to an upper end portion of the shaft 38 to limit the downward movement of the shaft relative to the cross bar 20. A helical spring 42 is compressed between the undersurface of the cross bar 20 and a second adjustable collar 44 on the shaft 38. Cotter pins 46 or analogous structure are used to secure the lower end of the shaft 38 against relative movement with relation to the lug 34.

A pair of elongated cylindrical deflectors 48 have their forward end portions secured to the lower ends of the arms 24, these deflectors being parallel and extending rearwardly from the frame 22 and having rear end portions 50 inwardly bent. In other words, the rear end portions 50 approach each other and are disposed in the same plane as the main portions of the deflectors 48. The forward extremities 52 of the deflectors 48 are turned up to comprise shoes disposed immediately to the front of the lower end portions of the arms 24.

Figure 4:
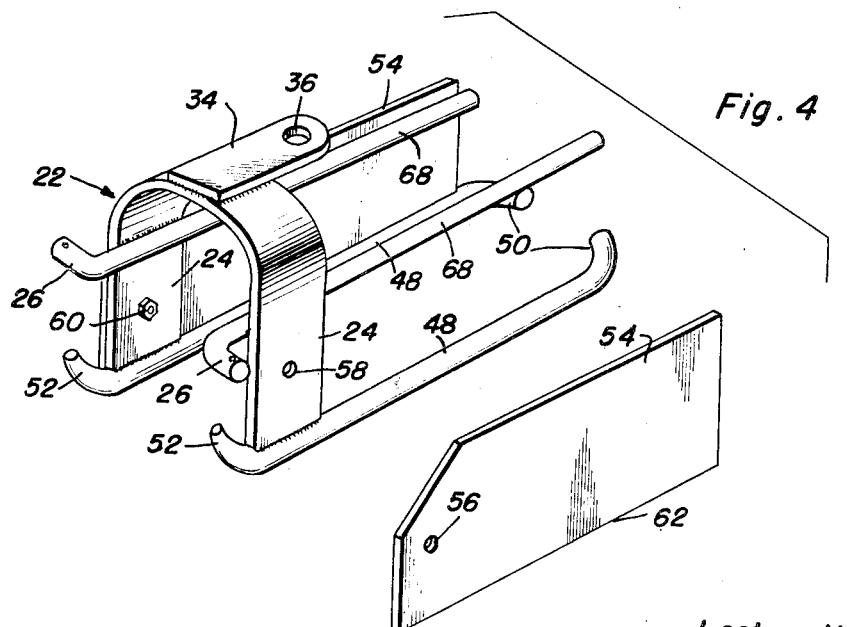
Figure 4 is a grouped view showing, in perspective, major portions of the elevator unit.

A pair of opposing plates 54 will be provided with apertures 56 and bolts 60 extend through these apertures 56 and corresponding apertures 58 in the arms 24, so that the plates 54 are secured to the outer sides of the arms 24. These plates 54 have straight lower edges 62 which may be engaged with the upper surfaces of the main portions of the deflectors 48. The plates 54 are substantially coextensive in length with the deflectors 48 and comprise earth baffles functioning as auxiliary earth moving and containing means, along with the deflectors 48. An alternative positioning of the plates 54, indicated in dash line at 64 in Figure 2 provides a space 66 between the lower edge 62 of each plate 54 and the top of the corresponding deflector 48, so that the efficiency of the plates 54 as baffles will be variable according to the adjustment of the plates. The bolts 60 may be loosened and the plates positioned as desired by the operator. Obviously, the earth moving and containing efficiency of the plates will be lessened by the upward pivoting thereof. Plate supporting arms 68 are provided to stabilize the upper portions of the plates 54, and these arms 68 may be integral with the pivots 26, as best illustrated in Figure 4.

The operation of this invention will be clearly understood from a consideration of the foregoing description and mechanical details thereof, taken in connection with the drawings and the above recitation of the objects of this invention. Further description is deemed unnecessary.

Having described the invention, what is claimed as new is:

1. In a cultivator having longitudinally disposed side frame elements secured together by a transverse rear frame element, a cultivator unit comprising a forwardly disposed cross rod, a rearwardly disposed cross bar, said cross rod and said cross bar being secured on said side frame elements, an inverted U-shaped frame including parallel arms, pivots secured on said arms, links extending between and pivotally secured to said cross rod and said pivots, a pair of elongated cylindrical deflectors rigidly secured to the ends of said arms as by welding, said deflectors being arranged substantially parallel and extending rearwardly from said U-shaped frame, a rearwardly extending lug rigidly attached to the bight portion of said U-shaped frame, said lug having an aperture adjacent the rearward end thereof, said cross-bar having an opening therein, a vertically extending rod received in said aperture and extending through said opening in said crossbar, said rod being in free sliding relation with said cross-bar, resilient means mounted on said shaft biasing said U-shaped frame downwardly with respect to said cross bar.

2. In a cultivator having longitudinally disposed side frame elements secured together by a transverse rear frame element, a cultivator unit comprising a forwardly disposed cross rod, a rearwardly disposed cross bar, said cross rod and said cross bar being secured on said side frame elements, an inverted U-shaped frame including parallel arms, pivots secured on said arms, links extending between and pivotally secured to said cross rod and said pivots, a pair of elongated cylindrical deflectors rigidly secured to the ends of said arms as by welding, said deflectors being arranged substantially parallel and extending rearwardly from said U-shaped frame, a rearwardly extending lug rigidly attached to the bight portion of said U shaped frame, said lug having an aperture adjacent the rearward end thereof, said cross-bar having an opening therein, a vertically extending rod received in said aperture and extending through said opening in said crossbar, said rod being in free sliding relation with said cross-bar, resilient means mounted on said shaft biasing said U-shaped frame downwardly with respect to said cross bar, the forward ends of said deflectors being turned up forming shoes disposed in front of said arms.

3. In a cultivator having longitudinally disposed side frame elements secured together by a transverse rear frame element, a cultivator unit comprising a forwardly disposed cross rod, a rearwardly disposed cross bar, said cross rod and said cross bar being secured on said side frame elements, an inverted U-shaped frame including parallel arms, pivots secured on said arms, links extending between and pivotally secured to said cross rod and said pivots, a pair of elongated cylindrical deflectors rigidly secured to the ends of said arms as by welding, said deflectors being arranged substantially parallel and extending rearwardly from said U-shaped frame, a rearwardly extending lug rigidly attached to the bight portion of said U shaped frame, said lug having an aperture adjacent the rearward end thereof, said cross-bar having an opening therein, a vertically extending rod received in said aperture and extending through said opening in said crossbar, said rod being in free sliding relation with said cross-bar, resilient means mounted on said shaft biasing said U-shaped frame downwardly with respect to said cross bar, plates pivotally secured to said arms, said plates constituting earth baffles extending above said deflectors.

4. In a cultivator having longitudinally disposed side frame elements secured together by a transverse rear frame element, a cultivator unit comprising a forwardly disposed cross rod, a rearwardly disposed cross bar, said cross rod and said cross bar being secured on said side frame elements, an inverted U-shaped frame including parallel arms, pivots secured on said arms, links extending between and pivotally secured to said cross rod and said pivots, a pair of elongated cylindrical deflectors rigidly secured to the ends of said arms as by welding, said deflectors being arranged substantially parallel and extending rearwardly from said U-shaped frame, a rearwardly extending lug rigidly attached to the bight portion of said U shaped frame, said lug having an aperture adjacent the rearward end thereof, said cross-bar having an opening therein, a vertically extending rod received in said aperture and extending through said opening in said cross-bar, said rod being in free sliding relation with said cross-bar, resilient means mounted on said shaft biasing said U-shaped frame downwardly with respect to said cross bar, plates pivotally secured to said arms, said plates constituting earth baffles extending above said deflectors, said plates being vertically adjustable with respect to said deflectors.

5. In a cultivator having longitudinally disposed side frame elements secured together by a transverse rear frame element, a cultivator unit comprising a forwardly disposed cross rod, a rearwardly disposed cross bar, said cross rod and said cross bar being secured on said side frame elements, an inverted U-shaped frame including parallel arms, pivots secured on said arms, links extending between and pivotally secured to said cross rod and said pivots, a pair of elongated cylindrical deflectors rigidly secured to the ends of said arms as by welding, said deflectors being arranged substantially parallel and extending rearwardly from said U-shaped frame, a rearwardly extending lug rigidly attached to the bight portion of said U shaped frame, said lug having an aperture adjacent the rearward end thereof, said cross-bar having an opening therein, a vertically extending rod received in said aperture and extending through said opening in said cross-bar, said rod being in free sliding relation with said cross-bar, resilient means mounted on said shaft biasing said U-shaped frame downwardly with respect to said cross bar, the rear ends of the deflectors being inwardly bent.

LESTER HAMMON.

References Cited in the file of this patent

UNITED STATES PATENTS

| Number | Name | Date |
| --- | --- | --- |
| 767,467 | Wright | Aug. 16, 1904 |
| 846,156 | Stamps | Mar. 5, 1907 |
| 914,237 | Browning | Mar. 2, 1909 |
| 1,159,170 | Brown | Nov. 2, 1915 |
| 1,351,704 | Starch | Aug. 31, 1920 |
| 1,495,113 | Schneider | May 20, 1924 |
| 1,987,403 | Knuth | Jan. 8, 1935 |
| 2,116,161 | Shanks | May 3, 1938 |